May 24, 1960  R. A. MICHAEL ET AL  2,937,710

MAGNETIC DUST TRAPS OR FILTERS

Filed Dec. 10, 1956

INVENTORS.
Ralph A. Michael
James A. Newkirk
William E. Preston

By: Brown, Jackson, Boettcher + Dienner
Attys

United States Patent Office 2,937,710
Patented May 24, 1960

2,937,710

MAGNETIC DUST TRAPS OR FILTERS

Ralph A. Michael, 621 Buell Ave., Joliet, Ill., James A. Newkirk, 203 Central Ave., Aurora, Ill., and William E. Preston, 504 N. Grant St., Hinsdale, Ill.

Filed Dec. 10, 1956, Ser. No. 627,254

4 Claims. (Cl. 183—7)

The present invention relates to filters for fluids and, particularly, to improved magnetic filters for gas services and for installation in service conduits in advance of regulating valves, meters, appliances and the like.

This application is a continuation-in-part of our copending application Serial No. 372,121, filed August 3, 1953, now Patent No. 2,789,655, granted April 23, 1957.

The object of the present invention is to provide improved filters of small size and economical manufacture that are conveniently installed in gas services and the like wherein they are reliable and efficient in use, readily cleaned, not subject to clogging or stoppage of flow, effective to eliminate contaminants of substantially all types regardless of the rate of flow, not subject to being destroyed by abrasion, and readily, easily and economically maintained.

Commercial combustible gas in passage to service locations will contain a large quantity of fine particles of dust, of which 90 to 100% is ferrous, usually in the form of iron oxide. The iron oxide particles are highly abrasive and in passage of the gas through valves, meters and the like, abrade and rapidly wear down the valve seats, orifices, fittings, etc. Also, the dust frequently clogs the lines and orifices creating a hazardous nuisance.

In view of the ferrous nature of the major portion of dust and dirt particles in the flowing fluid, we have conceived of employing magnetic filter means, wherein magnetized members are employed in the line of flow to attract and hold from further travel a great percentage of the total dust or contaminants. In our aforesaid copending application Serial No. 372,121, we have disclosed and claimed large size magnetic filter means, or dust traps for use in gas mains and the like.

The particular object of the present invention is the provision of improved magnetic filter units of small size and economical manufacture for use in gas services in advance of valves, meters and the like, and also for use in, or in conjunction with, gas operated appliances to afford full protection against the abrasive and clogging action of the dust entrained in the gas.

Another object of the invention is to provide improved magnetic filter units including a rod-like assembly of permanent magnets comprising a plurality of short permanent magnets preferably separated from one another, each end of each magnet serving as a collecting point whereby substantially the entire surface of the rod-like assembly is adapted for the attraction and holding of particles.

A further object of the invention is the provision of improved magnetic filter units of the character defined including a housing in which said rod-like magnet assembly is removably mounted, the housing and assembly being so constructed and arranged that magnetic particles collected by said assembly establish a filter through which the fluid passes and by means of which non-magnetic particles in the fluid are filtered out, the assembly being removable to facilitate cleaning.

A still further object of the invention is the provision of improved magnetic filter units of the character described including a non-magnetic container within which the rod-like magnet assembly is mounted, whereby the dust particles do not collect directly on the magnets and the magnet assembly may be readily and conveniently cleaned upon removal from the housing.

In addition to the foregoing, it is an object of the invention to provide improved magnetic filter units of the character defined wherein the housing may be formed of a non-permeable non-conductive material, such as plastic, so that the housing will insulate the service from the main and whereby dust particles will not accumulate on the housing.

Other objects and advantages of the invention will become apparent in the following detailed description of preferred embodiments of the invention.

Now, in order to acquaint those skilled in the art with the manner of making and using the improved magnetic filter means of the present invention, we shall describe, in connection with the accompanying drawing, several preferred embodiments of our invention and preferred manners of making and using the same.

Figure 1:
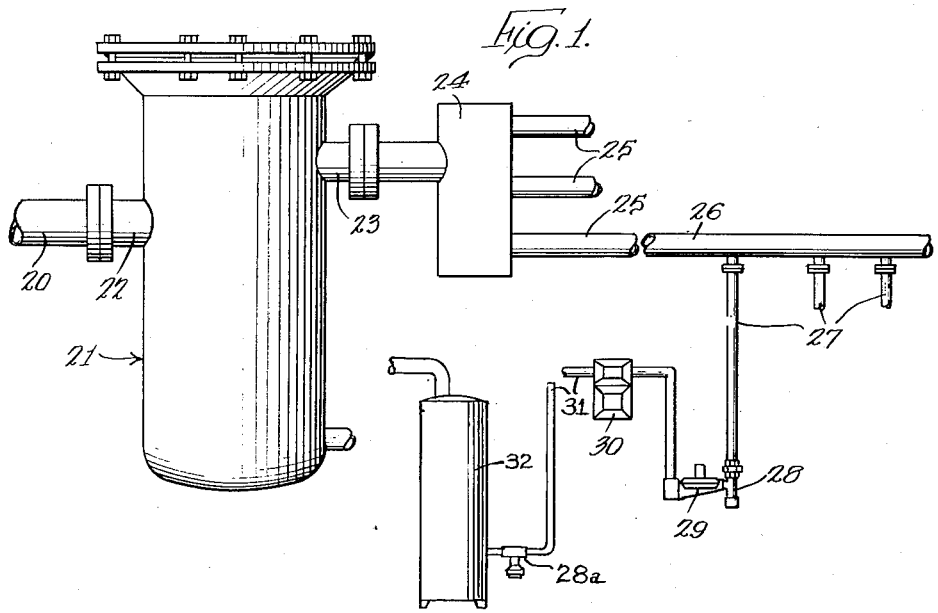
Figure 1 is a schematic representation of a fluid system showing a fluid supply line, a line filter, a plurality of mains leading from the line, a plurality of services leading from each main, a service filter, and facilities served by the service.

Referring now to the drawings, and particularly to Figure 1, we have schematically shown a conventional gas distribution system as comprising a large supply line 20 from which the gas for a particular community is to be drawn. As the gas passes through the line 20, the same accumulates a considerable quantity of dust and dirt particles. To remove such dust and dirt particles, it is preferable to provide a line filter 21 having an inlet 22 connected to the line 20 and an outlet 23 for conducting the filtered gas to the inlet of a header or feeder main 24 or the like. The filter 21 is preferably of the character disclosed in our said copending application. The header 24 is provided with a plurality of outlets 25 each of which is adapted to be connected to a gas main 26. The gas mains 26 are of intermediate size and are adapted to distribute the gas throughout the community. Each main 26 is adapted to supply a plurality of services 27, which each comprise a conduit leading to a place of use, such as a place of business, a residence, or the like. In its passage from the line filter 21 through the service 27, the gas usually will pick up some dust from the mains and service. To clean the gas prior to use thereof, a service filter 28 is provided, preferably within the building to which the service leads, in the service in advance of any valves, appliances, meters or the like. To the outlet side of the service filter 28, a pressure reducing or regulating valve 29 is normally provided and the gas is then conducted through a meter 30 for measurement of the gas consumption at the particular place of use. One or more conduits 31 lead from the meter 30 to conventional appliances, such as a water heater 32, and/or a furnace, stove, refrigerator and the like.

The service filter 28 is of small size and adapted to be installed conveniently and practically within the building served by the conduit 27. Several such filters may be found desirable, for example, one filter 28 in advance of the regulating valve and meter, and others, such as 28a, in advance of each of the appliances served, in this case the water heater 32. In the case of certain appliances, such as gas fired clothes driers, the filter may be incorporated directly in the appliance.

Figure 2:
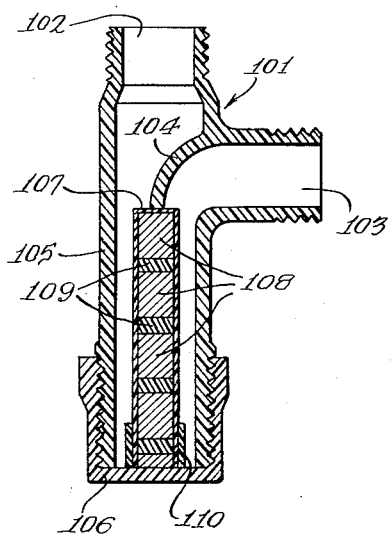
Figure 2 is a vertical section of one embodiment of the service filter means of the invention.

One embodiment of the service filter of our invention, particularly but not exclusively adapted for use as the unit 28 in Figure 1, is shown in Figure 2. In this embodiment, the device comprises a body or housing 101, which may be formed of a non-permeable and non-conductive material, such as plastic, the housing including a first port 102, a second port 103, a wall 104 extending between the two ports, and an extension portion 105 extending downwardly from the free edge of the wall 104 in general alignment therewith. Either of the ports 102 and 103 is adapted to be used as the inlet, as desired, and the housing is preferably provided with an external pipe thread at each port for the reception of suitable service conduits. The extension 105 is provided with an external screw thread whereby a removable closure cap 106, which may also be formed of a non-magnetic and non-conductive material, can be secured thereto. The space between the cap 106 and the free edge of the wall 104 is adapted for the reception of a rod-like permanent magnet assembly comprising a non-magnetic container or tube 107, suitably a flexible plastic tube, within which a plurality of short permanent magnets 108 and a plurality of non-magnetic spacers 109 are adapted to be mounted in alternate relation. The top of the magnet assembly is preferably closed off by the non-magnetic tubing 107 and abuts against the free edge of the wall 104 to seal against the wall so that fluid entering one port in the housing must flow around the magnet assembly before flowing through the outlet port.

The magnets 108 create a magnetic flux path extending through the tube 107 to establish magnetic lines of force surrounding the magnetic assembly. The leg 105 of the housing 101 is of a diameter only slightly larger than the magnet assembly, so that the magnetic lines of force extend from the assembly to the surrounding walls of the leg 105. Thus, in effect, a magnetic obstruction is presented in the path of flow of the gas so that any particles entrained in the gas capable of being magnetized will be attracted to and held against the tube 107 by the permanent magnets disposed within the tube. Since 90 to 100% of the contaminants in flowing gases comprise iron oxide, it will be appreciated that the filter unit of the invention is effective to filter out all or substantially all of the dust in commercial gas by magnetic attraction. Also, as the dust builds up on the tube or container 107, the magnetic dust will establish a porous but substantially continuous pattern of dust particles between the magnet assembly and the walls of the housing leg 105 so that gases passing therethrough will be filtered by the collected dust itself. Thus, non-magnetic or non-permeable particles entrained in the gas will also be filtered out.

The filter of the present invention is not subject to clogging for the reason that if the dust collected on the tube 107 becomes too dense, the same will gravitate to the bottom of the leg 105. With respect to the filter net work which will be set up by collected magnetic particles, it will be apparent that the particles may shift and move apart when necessary to accommodate the flow of gas, so that the same will in no way clog the filter or obstruct the substantially free flow of gas from the inlet to the outlet. Also, there will be a continuous gradual downward migration of the dust particles due to the force of gravity. As will be obvious, dust gravitating to the bottom of the housing 101 will be located generally outside of the path of gas flow so that the same will not again be picked up and entrained in the flowing gas.

As will be appreciated, the amount of contamination in a service conduit where the system is provided with a large type filter such as 21 will be quite small so that the service filter unit need not have a large contaminant collection capacity. To center the magnet assembly within the housing 101, the closure cap 106 preferably includes a tubular guide 110 in which the lower end of the magnet assembly may be positioned.

The service filter unit shown in Figure 2 is extremely economical of manufacture and assembly. The device is highly efficient in use and is readily maintained. To clean the filter, it is merely necessary to remove the cap 106, pull out the magnet assembly, wipe the same off, and then reassemble the magnets and the cap 106 with respect to the housing. Dust collected in the bottom of the extension 105 will automatically gravitate from the housing upon removal of the cap 106.

When formed of a non-permeable material, the housing itself does not attract dust particles, whereby cleaning of the filter is facilitated. If the material of the housing is also nonconductive, the filter unit electrically isolates the users equipment and piping from the main and service conduits of the supply system, which is highly advantageous. To that end, the housing 101 may be formed of a non-permeable, non-conductive material, and may particularly comprise a molded plastic member, whereby the same affords the specific advantages above referred to and in addition is highly economical.

As will be appreciated from the foregoing and a consideration of Figure 2, the present embodiment of the invention comprises a three-legged housing which may be non-permeable and non-conductive, a first port being provided in one leg, a second port being provided in a second leg, and a magnet assembly being provided in the third leg, with means being provided in the housing to insure disposition of the magnet assembly between the two ports with respect to the path of fluid flow. In the particular embodiment, we have provided an axial port 102 and a radially disposed port 103, whereby the unit is particularly adapted for association with the type of valve indicated at 29 in Figure 1.

Figure 3:
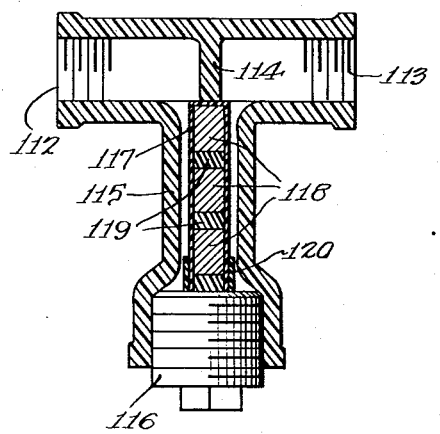
Figure 3 is a view similar to Figure 2 of a second embodiment of the service filter means of the invention, which embodiment is also particularly adapted for installation immediately in advance of or within appliances to be operated by the fluid in the system.

A second embodiment of the service filter unit of the present invention is disclosed in Figure 3, which embodiment is particularly but not exclusively adapted for use as the unit 28a of Figure 1, i.e., in conjunction with a particular appliance. As shown in Figure 3, the service filter unit comprises a T-shaped housing 111, which may be formed of a non-permeable, non-conductive material, such as molded plastic, wherein the horizontal portion of the T comprises an axial passageway presenting ports 112 and 113 at opposite ends thereof. In the center of the passageway, a transverse wall 114 is provided so as to direct fluids flowing through the passageway into the stem or extension 115 of the T. Internal threads are preferably provided at each end of the passageway formed in the horizontal portion of the T so that the ports 112 and 113 are adapted for the association therewith of suitable service conduits. The stem portion of the T is enlarged at the lower end thereof and the said enlargement is provided with an internal thread whereby the same is adapted for the reception of a closure plug 116. A rod-like magnet assembly, comprising a non-magnetic container or tube 117, such as a plastic tube, within which a plurality of permanent magnets 118 and a plurality of nonmagnetic spacers 119 are arranged in alternate relation, is adapted to be disposed within the stem portion of the T-shaped housing between the free edge of the wall 114 and the top of the plug 116. Thus, the magnet assembly is disposed directly in the path of fluid flow for the attainment of the purposes and advantages described with respect to the embodiment of the invention shown in Figure 2. Preferably, a tubular guide 120 is provided on the top of the plug 116 within which the magnet assembly may be disposed to center the magnet assembly in the housing. As will be apparent, the embodiment of the invention shown in Figure 3 is adapted for the accomplishment of the same filtering functions as the embodiment of the invention previously described.

While we have described and shown what we regard to be preferred embodiments of our invention, it will be appreciated that various changes, rearrangements and modifications may be made therein without departing from the scope of the invention as defined by the appended claims.

We claim:

1. A filter for flowing fluids comprising a non-magnetic housing having a fluid inlet and a fluid outlet, magnetic means comprising a rod-like assembly of a plurality of relatively short permanent magnets removably mounted within said housing between said inlet and said outlet for collecting magnetic particles present in the fluid, and a non-magnetic container enclosing said magnetic means for preventing direct contact of the flowing fluid and magnetic particles therein with said permanent magnets, whereby, upon removal of said magnetic means from said housing, said housing is readily emptied of particles accumulated therein and said magnetic means is readily cleaned due to the fact that said container separates the magnets from the magnetic particles.

2. A filter for flowing fluids comprising a nonpermeable, non-conductive housing having a fluid inlet and a fluid outlet, and a rod-like magnetic assembly removably mounted in said housing between said inlet and said outlet, said assembly comprising a non-permeable, non-conductive tube, and a plurality of relatively short permanent magnets mounted within said tube and enclosed thereby, said assembly being disposed directly in the path of fluid flow through said housing to attract and collect magnetic particles in the fluid and being closely surrounded by said housing to establish a filter screen through which the fluid passes and by means of which non-magnetic particles in the fluid are filtered out, said non-conductive housing and tube providing an insulated path of fluid flow, said assembly being removable from said housing whereupon said housing, being non-permeable, is readily emptied of particles accumulated therein and said assembly is readily cleaned due to the fact that said non-permeable tube separates the magnets from accumulated particles.

3. A magnetic filter unit comprising a three-legged housing having a first port in one leg, a second port in a second leg, wall means between said ports blocking off direct flow therebetween and directing fluid flow into the third leg, and a rodlike magnetic assembly mounted in said third leg adjacent said wall means, said assembly including a plurality of permanent magnets and a non-magnetic casing therefor, said casing enclosing the magnets and facilitating cleaning of the filter by separating said magnets from magnetic particles accumulated thereby.

4. A magnetic filter unit comprising a three-legged non-permeable, non-conductive housing having a first port in one leg, a second port in a second leg, wall means between said ports blocking off direct flow therebetween and directing fluid flow into the third leg, and a rod-like magnetic assembly mounted in said third leg adjacent said wall means, said assembly comprising a non-permeable, non-conductive tube and a plurality of short permanent magnets disposed in spaced relation to one another and mounted within and enclosed by said tube, said non-conductive housing and tube providing an insulated path of fluid flow, said housing including a removable closure for said third leg accommodating removal of said assembly whereupon said housing, being non-permeable, is readily emptied of particles accumulated therein and said assembly is readily cleaned due to the fact that the non-permeable tube separates the magnets from accumulated particles.

References Cited in the file of this patent

UNITED STATES PATENTS

| | | |
|---|---|---|
| 569,203 | Hunt | Oct. 13, 1896 |
| 817,649 | Lowe | Apr. 10, 1906 |
| 2,314,573 | Clark et al. | Mar. 23, 1943 |
| 2,508,666 | Franz | May 23, 1950 |
| 2,596,743 | Vermeiren | May 13, 1952 |
| 2,721,659 | Turcotte | Oct. 25, 1955 |
| 2,789,655 | Michael et al. | Apr. 23, 1957 |

FOREIGN PATENTS

| | | |
|---|---|---|
| 673,699 | Great Britain | June 11, 1952 |